FIG. 1B

Aug. 12, 1969  G. J. GRIBAS ET AL  3,460,547
APPARATUS FOR TREATING AND INSPECTING CASTINGS AND LIKE OBJECTS
Filed Oct. 5, 1967  8 Sheets-Sheet 8

United States Patent Office 3,460,547
Patented Aug. 12, 1969

3,460,547
APPARATUS FOR TREATING AND INSPECTING CASTINGS AND LIKE OBJECTS
George J. Gribas, Lake Forest, Lake Hopatcong, George C. Kinney, Landing, and Edwin Cummings, Jr. Bloomfield, N.J. assignors to Howmet Corporation, New York, N.Y., a corporation of Delaware
Filed Oct. 5, 1967, Ser. No. 673,185
Int. Cl. B08b 3/04
U.S. Cl. 134—46    9 Claims

ABSTRACT OF THE DISCLOSURE

An apparatus for systematically transporting, treating and inspecting castings and like objects. A plurality of object-carrying transport modules are used to transport the objects along trackways which pass through a selected arrangement of treatment and inspection stations. The stations and the modules are adapted to permit accommodation by the stations of an integral number of modules so that the modules may be advanced along sections of trackways in a step-by-step manner to systematically treat and inspect the objects carried thereon.

Background of the invention

Castings and like objects may be inspected to determine if they include defects, flaws or other externally observable characteristics by the method of treating the object in a selected sequence with various fluids and substances and by observing the treated surface. Treatment fluids may be removed after inspection by further treatment steps. Proper treatment of each object requires the application and removal of various substances, such as fluorescent penetrants, in a selected sequence and for selected time periods. In one such treatment and inspection method the surface areas of the objects are initially coated with a fluorescent penetrant treatment fluid and thereafter treated with other substances in a selected sequence.

Objects desired to be treated are often numerous and have differing sizes and shapes. Prior techniques for handling such objects during treatment and inspection have failed to provide effective and efficient treating and inspecting of numerous objects of varying sizes and shapes.

Summary of the invention

The present invention provides an apparatus for systematically and effectively transporting, treating and inspecting a plurality of objects of differing sizes and shapes. Object-carrying transport modules capable of carrying objects of differing sizes and shapes are transported along a trackway system through treatment and inspection stations designed and arranged to accommodate the modules in a systematical manner, the sequence and timing of each treatment and inspection being predetermined by the design of the stations, their arrangement and by a suitable control system.

Broadly, the present invention comprises an apparatus of systematically treating and inspecting castings and like objects comprising a trackway upon which a plurality of object-carrying transport modules are conveyed, the modules being adapted to be accommodated in integral numbers by the treatment and inspection stations, including enclosed stations, positioned along the trackway. The modules are transported in tandem abutting relationship along at least one portion of the trackway by indexing means which advance the modules a standard distance after completion of each treatment and inspection. The modules and the enclosed stations are designed to permit the stations to be enclosed around trays tandemly and abuttingly positioned on the trackway. Additional trackways passing through additional or alternative treatment and inspection stations may be used together with a transfer station for transporting modules between the trackways.

All modules used in an apparatus in accordance with the invention have external dimensions which permit an integral number of the modules to be positioned in the stations and the modules are further designed to be similarly oriented during their transport so that a plurality of the modules may be advanced step-by-step through treatment and inspection stations. When a plurality of tandemly-arranged abutting modules are advanced by moving the last module ahead one modular distance, modules are moved completely into or completely out of the station permitting systematic control of the time of treatment and inspection of the objects. The modular distance the modules advance is the external dimension of a properly oriented module measured along the trackway.

The modules are adapted for use in enclosed stations having entrance and exit doors since the modules include separator means for receiving enclosure doors when the doors are closed to complete the housing enclosure which contains the treatment fluids.

The treatment and inspection stations may be arranged along a plurality of trackways having means for transferring modules between trackways.

Description of the preferred embodiment

Figure 1A:
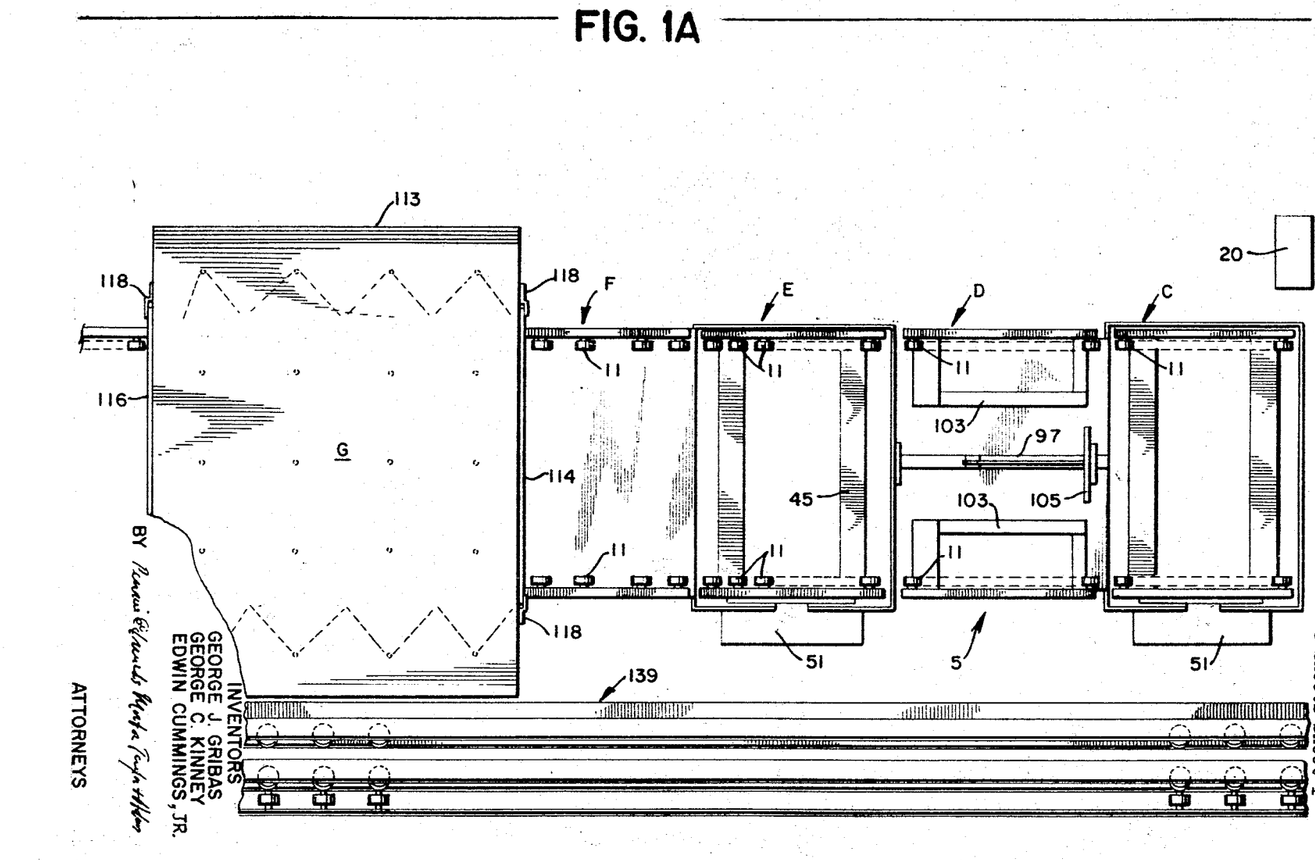
FIGS. 1A, 1B and 1C are a plan view of of apparatus.
Figure 1B:
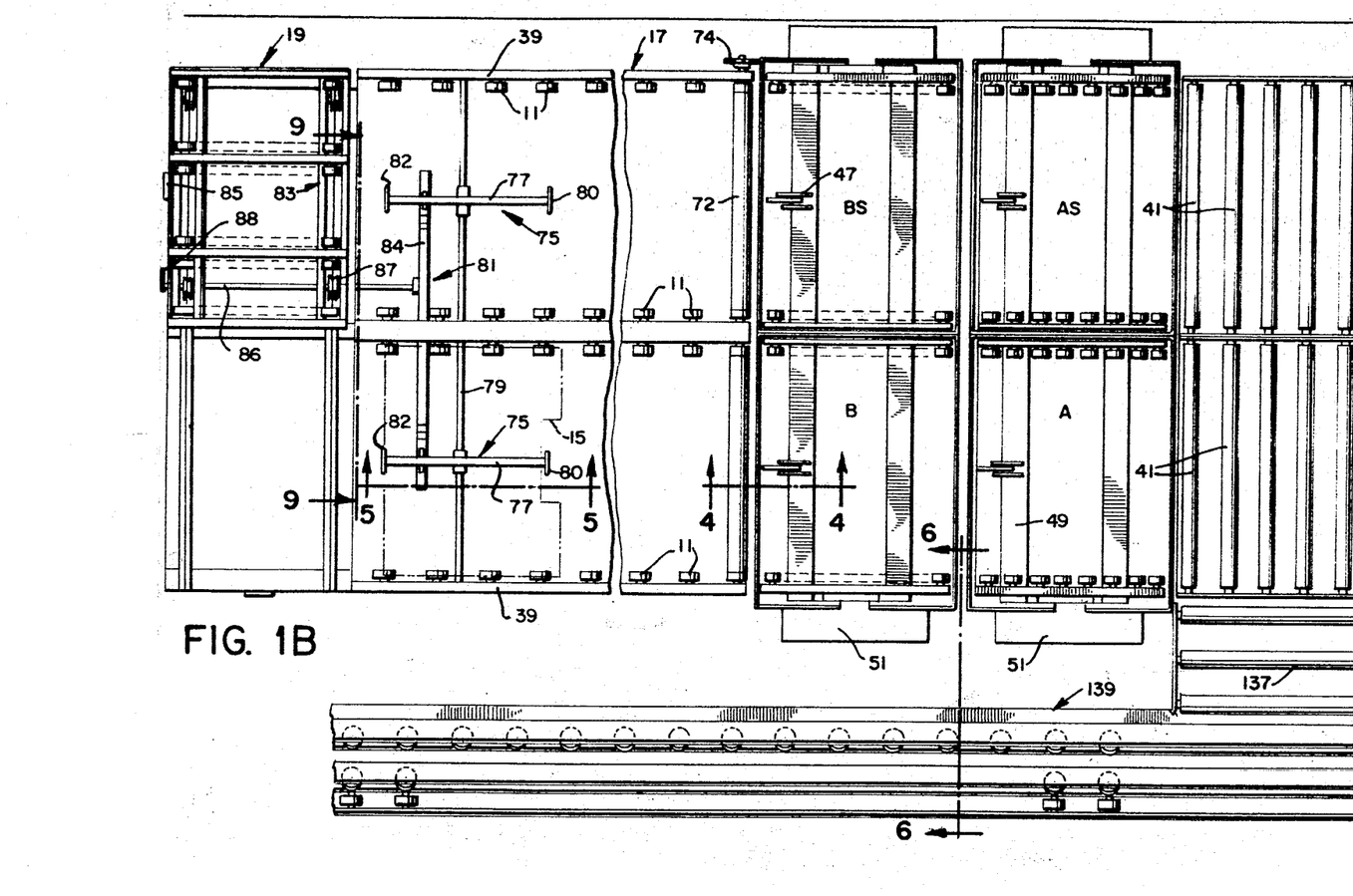
Figure 1C:
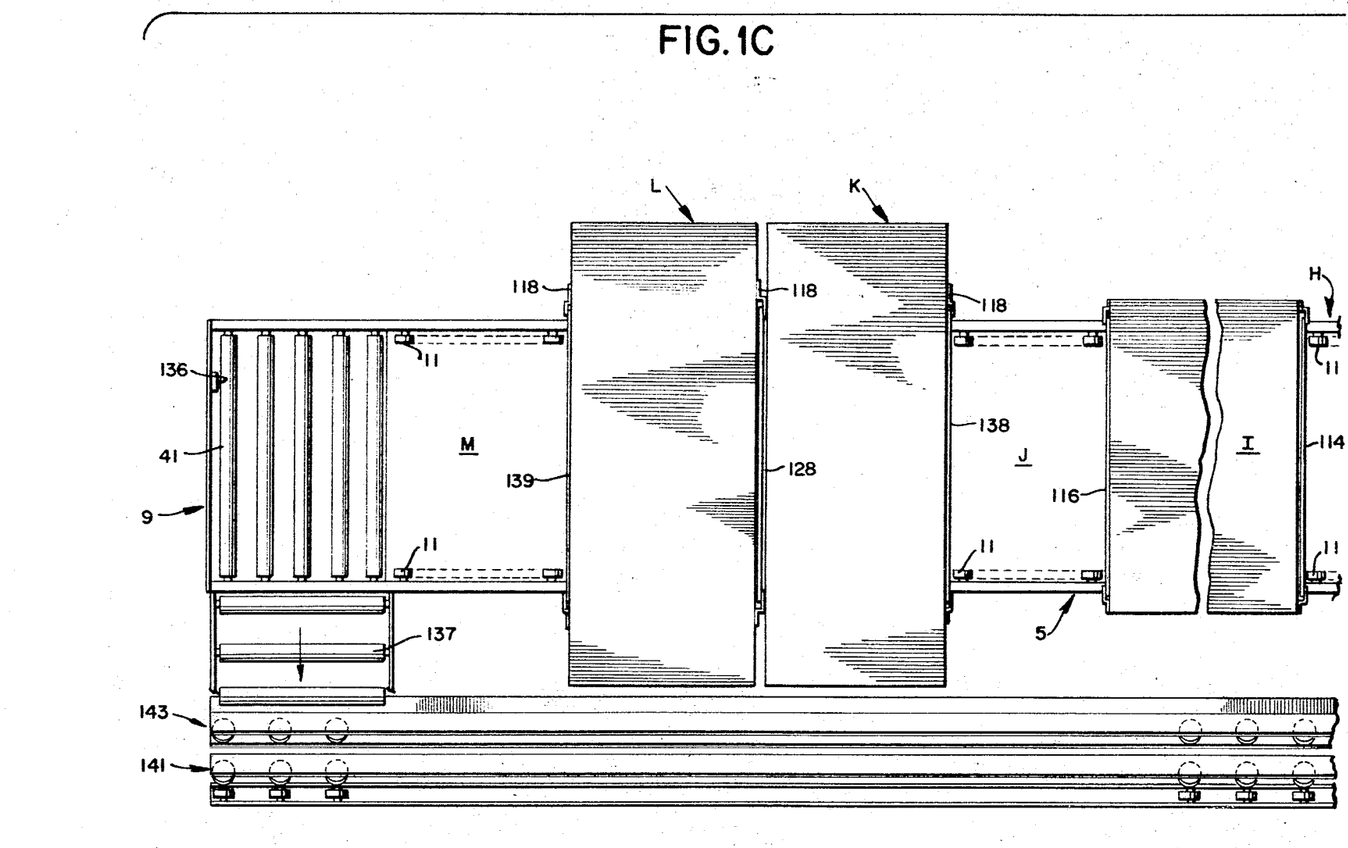
Figure 2A:
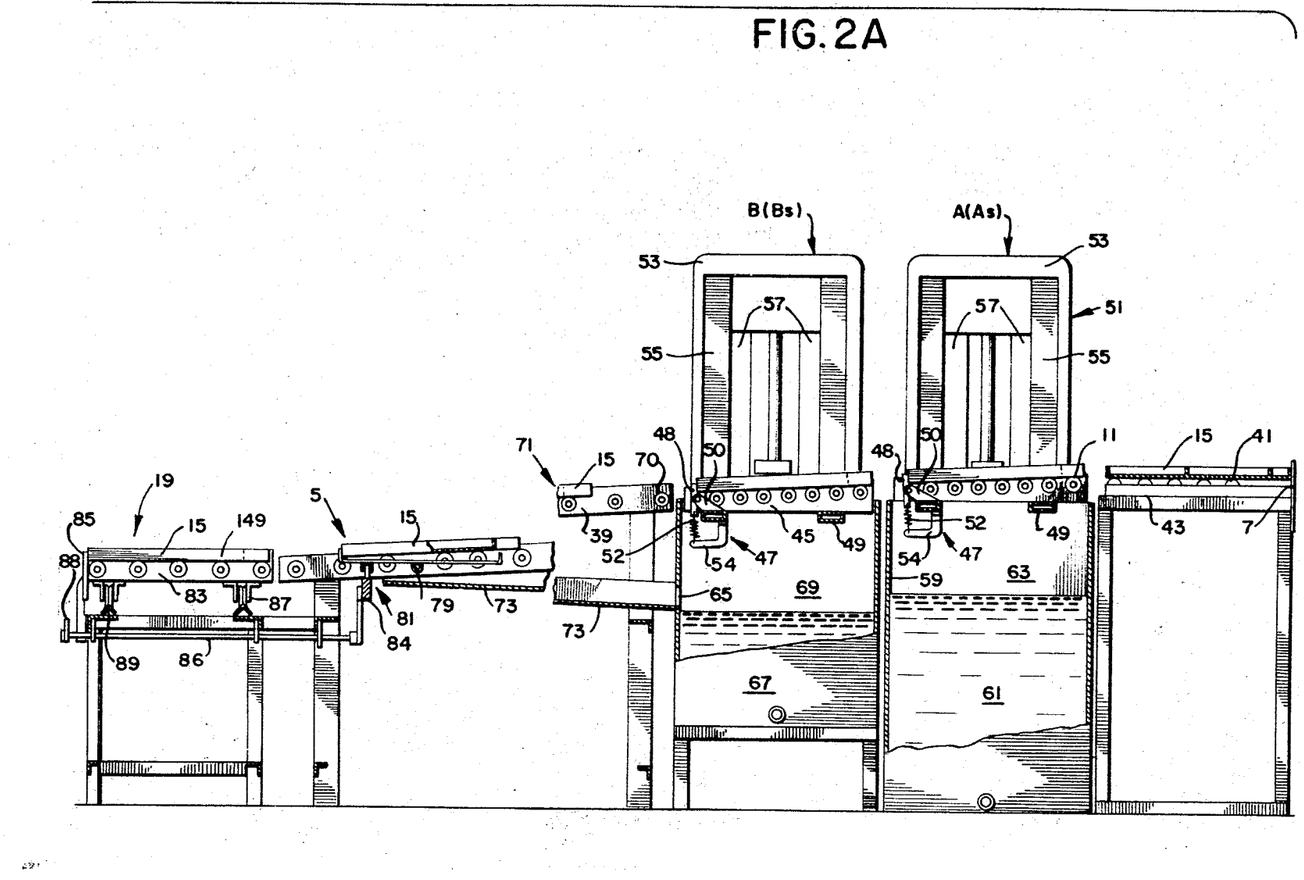
FIGS. 2A, 2B and 2C are an elevation view of the apparatus with portions sectioned.
Figures 2B, 8:
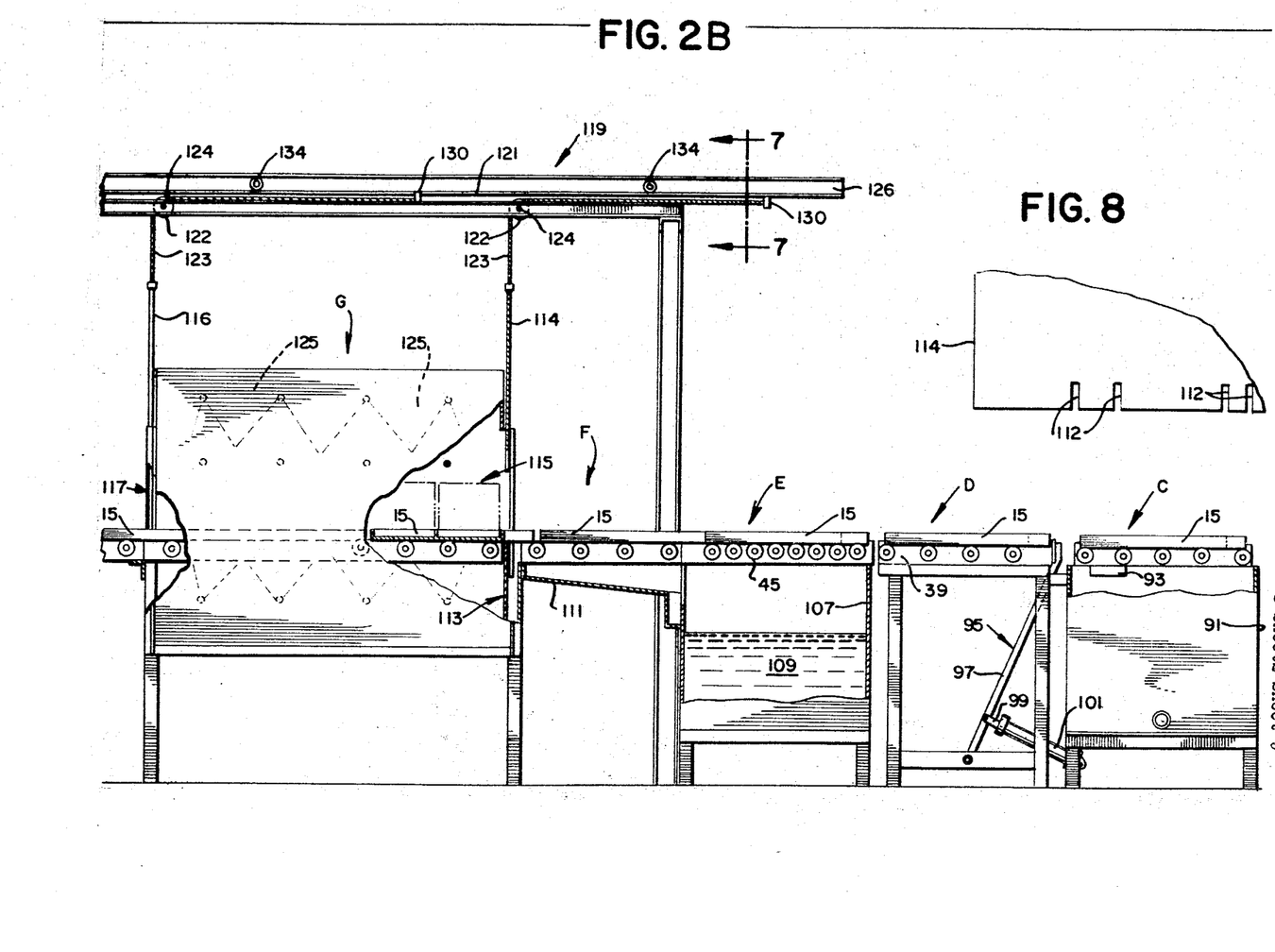
FIG. 8 is a partial elevation view of a guillotine door.
Figure 2C:
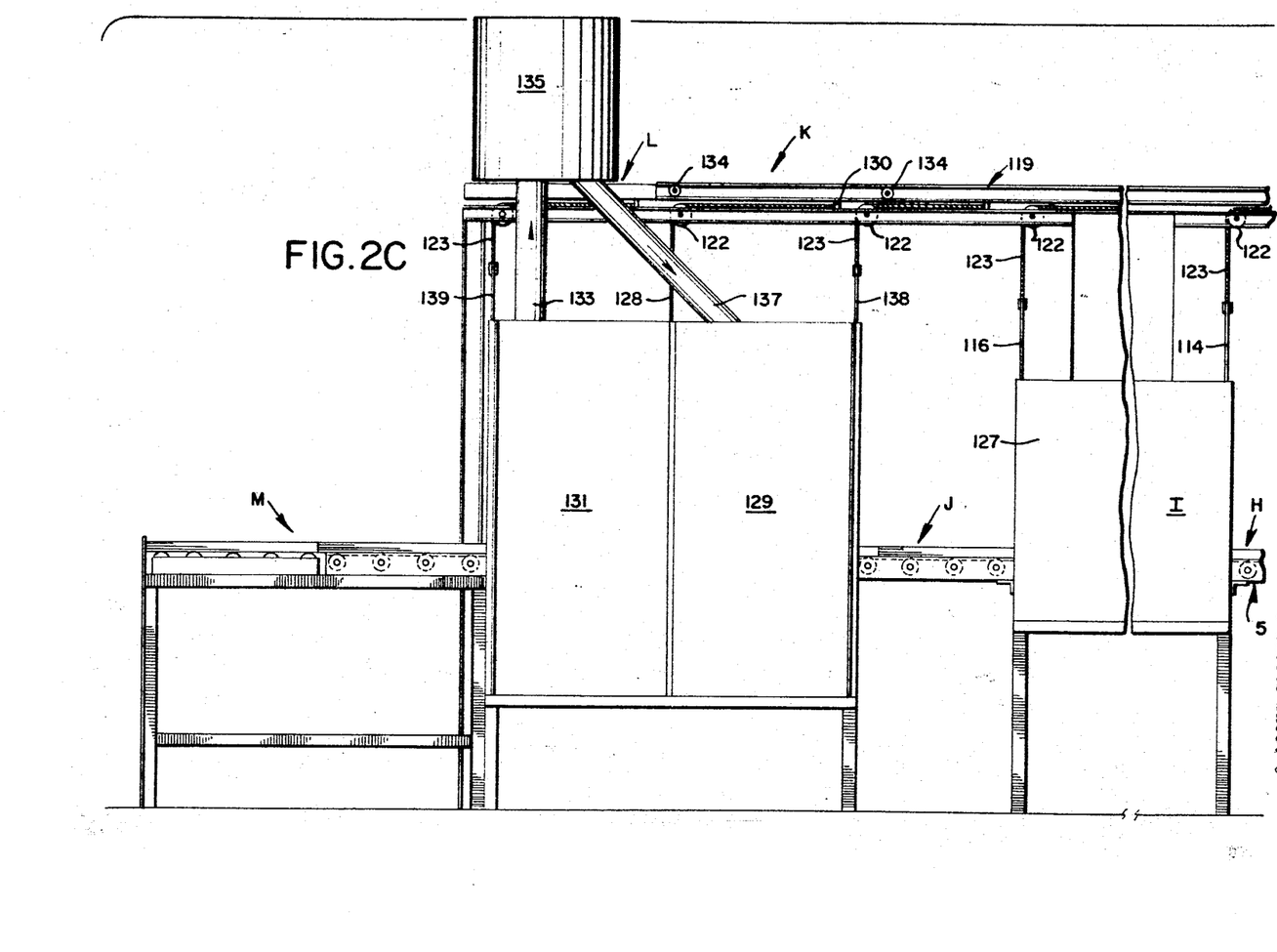
Figures 3, 4:
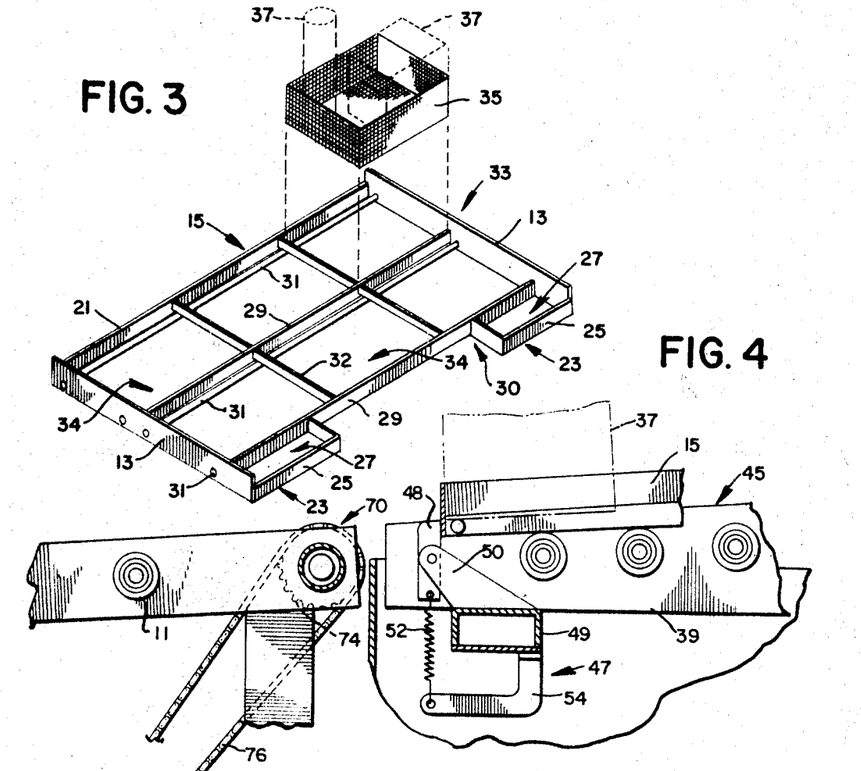
FIG. 3 is a perspective view of a modular tray.
FIG. 4 is a sectional view along line 4—4 of FIG. 1.

In the drawings and with particular reference to FIGS. 1, 2 and 3, main trackway 5 provides a continuous tray conveying surface from the loading table 7 to the unloading table 9 and includes two parallel rows of short rollers 11, the rows being spaced apart a sufficient distance to support in rolling engagement the side pieces 13 of the modular trays 15 (FIG. 3) when the trays are oriented on the trackway 5 with their longer external dimension perpendicular to the principal direction of tray movement along the trackway. The external tray dimension parallel to the side pieces 13 is substantially equal to the standard distance the trays 15 are advanced along the trackway after each treatment and inspection operation.

The modular trays 15 have standard external dimensions and are designated to be accommodated by the treatment and inspection stations. It is contemplated that more than one tray be used and that normally more than a dozen trays would be in use in an installation in accordance with the invention. Modules differing in shape and size from the modular tray 15, shown in FIG. 3, may be used providing the module is capable of carrying objects to be treated, is readily transported and is capable of enclosure while positioned in tandem abutting relationship with other modules.

A secondary trackway 17, positioned parallel to main trackway 5, extends from the loading table 7 to the tray transfer station 19, where trays 15 are transferred to the main trackway 5.

Referring again to FIG. 3, tray 15 includes a front bumper 21 and a two-piece back bumper 23, the trays preferably being conveyed along the trackway oriented with the front bumper 21 ahead of the two-piece back bumper 23. Back bumper 23 consists of the two outside frame elements 25 of spacer units 27. Tray 15 also includes longitudinal frame pieces 29, bars 31, cross pieces 32 and side pieces 13 suitably positioned to provide an object support section 33 comprising nine (9) rectangular-shaped compartments 34 for supporting baskets 35. When baskets are not used large castings are supported directly on the tray frame pieces. Baskets 35 are preferably fabricated of wire to provide adequate exposure of the castings 37 (shown in dashed lines) to the fluid treatments and to facilitate viewing and inspection of the treated castings. Side pieces 13 are wider than the other tray frame pieces to hold large castings on the tray when baskets are not used. Other frame pieces of the object support section 33 may be made wider to contain large castings. It is contemplated that trays with standard width side pieces 13 may also be used and that trays of varying internal construction may be used during a treatment and inspection run. Any number of compartments 34 may be used and bars 31 are preferably round and spaced from the tray frame pieces to prevent dirt and fluid from collecting on the tray. Spacer units 27 together with the open rectangular area 30 bordered by units 27 and the longitudinal frame piece 29 provide a separator or spacer section extending the width of the tray.

Trays 15 when advanced in bumper-to-bumper arrangement do not require separation to permit the housings of the stations to be closed for treatment, the housing doors being adapted to pass through the separator section. Castings and other objects having a wide range of sizes and shapes may be handled by the modular trays 15 and, if desirable, compartments 34 may be varied in size to handle differing-sized baskets to accommodate the particular objects to be inspected.

Turning again to FIGS. 1 and 2, trackways 5 and 17 include longitudinal track rail sections 39 having a short rollers 11 mounted on them at a distance below their upper edges so that they serve as guides to prevent the trays from moving laterally off the trackways. The track rail sections 39 are tandemly arranged in rows forming, together with other structure elements, the trackway system for the trays.

The loading table 7 which serves both trackways has a plurality of long rollers 41 to provide a reduced-friction surface upon which the trays 15 are placed and moved. The main trackway 5 passes through a complete series of treatment and inspection stations, the first portion of the trackway passing through initial treatment stations including the fluorescent penetrant treatment station and the second portion passing through subsequent treatment and inspection stations. The secondary track 17 which parallels the first portion of the main trackway passes through corresponding initial treatment stations and provides the versatility of treating selected tray loads of castings 37 with a different penetrant treatment fluid without the requirement of emptying and re-supplying the main trackway stations. In some treatment arrangements only one trackway need be used.

Each tray placed on the loading table 7 is, after proper loading with object-carrying baskets 35, pushed by the equipment operator along either the main or secondary trackway. The trackways and associated treatment stations being similarly constructed, they are described together using corresponding numbers on the drawings. Each tray moves onto the inclined elevator platform 45 of degreasing treatment station A or AS until the front bumper 21 of the tray engages a spring-loaded stop 47. Referring also to FIG. 4, which illustrates a similar stop positioned on the elevator of the succeeding station, it is seen that stop 47 includes stop plate 48 pivotably mounted on bracket 50, the plate 48 being held in a vertical position by the tension of spring 52 secured to arm 54. Tray movement along the trackway may alternatively be controlled by remotely operated rocker arm stops similar to those shown in FIGS. 1 and 5.

Figure 6:
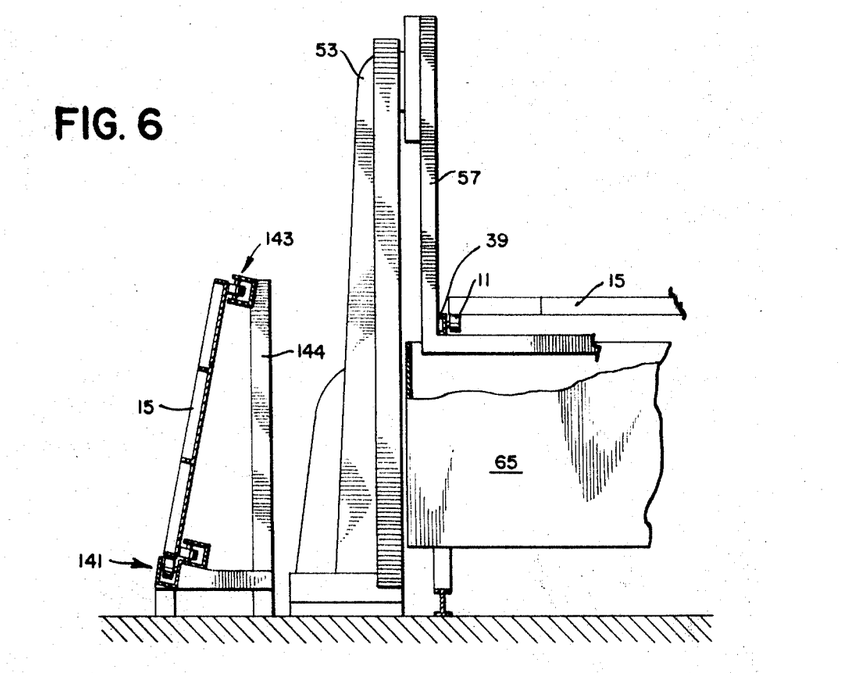
FIG. 6 is a sectional view along line 6—6 of FIG. 1.

Elevator platforms 45 include rail sections 39 secured to transverse beams 49, the platform being raised and lowered by lifts 51 which in turn have frames 53, stationary guides 55 and vertically reciprocable forks 57 which are secured to the platforms 45 (see FIG. 6). The degreasing stations A and AS each include a tank 59 for containing the degreasing fluid 61, such as trichloroethylene, a portion of which is vaporized using electric heaters and water condenser units (not shown). Any suitable control mechanism for controlling the heaters and condensers may be used. Proper control of the temperature provides a vapor atmosphere 63 in the upper portion of the tanks. Lifts 51 are controllable to permit the trays to be selectively lowered into the vapor or liquid portion of the tanks.

When the elevator platforms 45 of the degreasing stations are returned to trackway level, the operator pushes another tray along the trackway thereby overcoming the spring tension of stops 47 and permitting the first tray to pass into the fluorescent penetrant treatment station B or BS, portions of which have construction similar to the degreasing treatment stations and corresponding numbers are therefore used on the drawings. The treatment liquid is contained in the two tanks 65, positioned side by side, the level in the tanks being such that the elevator platforms 45 when lowered submerge the trays and castings in the liquid. Unlike the previous station the elevators are operable to one instead of two down positions. The fluorescent penetrant tanks of the main and secondary stations are preferably supplied with different treatment penetrant fluids.

Trays pushed off the penetrant elevator platforms 45 are urged by driven roll arrangement 70 and by the force of gravity down drain ramps 71. Referring to FIGS. 1 and 4, driven roll arrangement 70 includes driven roll 72, sprocket 74 and drive belt 76 which is driven by a motor (not shown). Drain ramps 71, which are preferably long enough to accommodate a large number of trays and permit adequate draining and drying, permit excess treatment fluids to drain into reverse-inclined drain pans 73 which drain into their corresponding tanks. The ramps 71 are inclined to provide transportation of the trays along the trackways. Trays reaching the lower end of the ramps 71 engage pivotable stops 75 and are held on the ramps until the stops are released by an operator.

Figure 5:
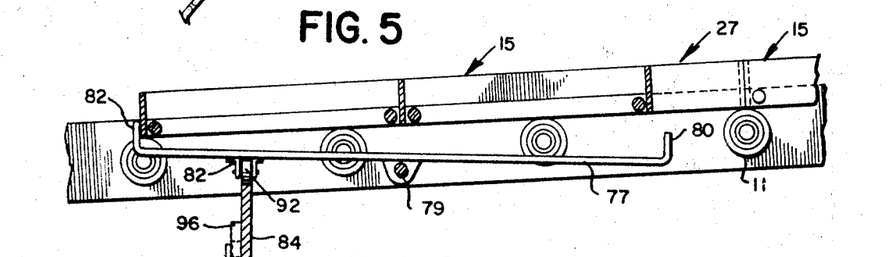
FIG. 5 is a sectional view along line 5—5 of FIG. 1.
Figure 9:
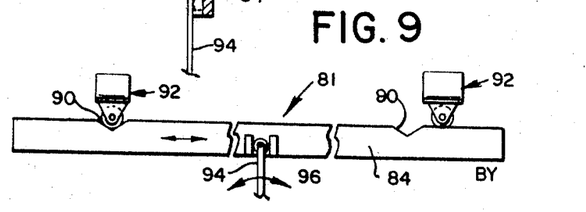
FIG. 9 is a broken sectional view along line 9—9 of FIG. 1.

Pivotable stops 75 include rocker arms 77 secured to a pivotable rod 79 (see FIG. 5). The rocker arms 77 have first and second vertical fingers 80 and 82 at each end, the rocker arms and the fingers being constructed so that when a rocker arm 77 is tilted to release a tray, first finger 80 moves in the open rectangular area between spacer units 27 of the tray (FIG. 1) thereby not restraining the tray released from rolling and holding the tray behind the released tray. After the released tray passes, the rocker arm is then turned to a position so that the second finger 82 engages the next tray that rolls down. Referring to FIGS. 1, 5 and 9, rocker arms 77 are rocked or tilted by a manually-operated control linkage arrangement 81 having a slidable cross-piece 84 which is caused to slide in directions perpendicular to the trackway through upright 94 secured to rod 86 and stationary guides 96 on the crosspiece 84. Cross-piece 84 has notches 90 which receive rotatable cam units 92 mounted on the under sides of rocker arms 77. When the cross-piece 84 is moved cams 92 ride into and out of the notches 90 and arms 77 are raised, held steady or lowered. The notches and other dimensions of the control arrangement linkage 81 being such that only one tray at a time is released to the transfer table. For example, normally both cam units 92 are out of notches 90 to prevent tray movement. When cross-piece 84 is moved toward the main trackway the cam unit of secondary arm 77 falls into a notch 90, arm 77 being biased to rotate counterclockwise as viewed in FIG. 5, and a tray is released on the secondary trackway. If the cross-piece 84 is continued in the same direction, the cam unit of the secondary arm 77 will move out the notch permitting the secondary trackway trays to advance one tray until the lead tray strikes finger 82 and as the cam unit of the main trackway falls into its notch a tray will be released from that trackway onto the transfer table. Rod 86 has a handle 88 on the end adjacent transfer table 83.

Trays permitted to roll from the main and secondary trackways pass onto the transfer table 83 and engage stationary stop 85. Transfer station 19 includes table 83 and stationary V-rails 89, the table 83 comprising track rail sections 39, frame pieces 149 and flanged wheels 87 for rolling movement back and forth on the V-rails. The tray transfer table 83 and the control linkage arrangement 81 are preferably operated by an operator positioned at or near the transfer station.

Trays are allowed to move by gravity from the transfer table 83 to the emulsifier treatment station C, which station is equipped with a one-tray elevator platform 45 and lift arrangement similar to the fluorescent penetrant treatment stations. When a tray is moved onto the platform 45, a switch is actuated to cause the platform to descend and momentarily immerse the tray in a suitable emulsifier liquid in the emulsifier tank 91. Treatment at the emulsifier station serves to partially stop the chemical action of the fluorescent penetrant. As the platform 45 begins to rise, vibrator 93 attached to the platform is energized to vibrate the tray and its contents to remove excess emulsifier fluid to permit its reuse. The surface of the castings includes the surface and the areas adjacent to the surface which are penetratable by the treatment solutions.

The trays are next moved into the one-tray indexing station D where a power-operated pusher 95 which includes pusher arm 97, actuating arm 99 and power cylinder 101 causes the tray to be advanced or indexed one modular advance distance. Indexing station D is constructed of two frame sections 103 with open center portion to permit pusher arm 97 having pusher shoe 105 to engage the back longitudinal frame piece 29 between spacer sections 27 and to permit its reciprocation during the indexing operation. The indexing station functions to advance trays along the substantially horizontal section of the main trackway which follows the indexing station.

Trays advanced by the indexing station D are first moved onto the dip wash station E having an elevator platform 45 and lift 51 similar to the penetrant stations, the trays being lowered into and out of a wash tank 107 containing an adequate supply of water 109. When the dip wash elevator platform 45 returns to trackway level, the indexing pusher 95 indexes the trays one modular advance distance, approximately the distance between the front and back bumpers 21 and 23 of a modular tray. The trays are advanced to the first inspection station F where the dip wash is inspected while the trays and their contents drain excess wash water 109 which returns to tank 107 along wash drain pan 111. It should be noted that trays advance in abutting relationship along the selection of the main trackway 5 extending from the indexing station D to the unloading station 9.

Figure 7:
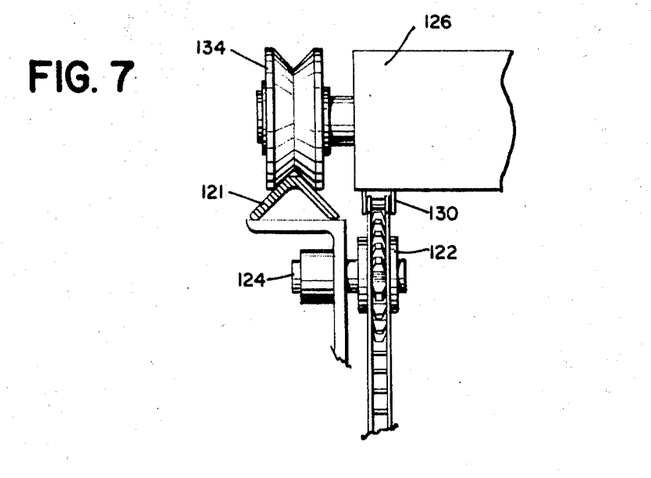
FIG. 7 is a sectional view along line 7—7 of FIG. 2.

The spray wash station G, which accommodates two modular trays, includes a housing enclosure 113 including an entrance opening 115 and an exit opening 117. Entrance guillotine door 114 and exit guillotine door 116 are vertically reciprocal in slides 118 (FIG. 1). Referring to FIGS. 2 and 7, door reciprocating system 119 includes overhead stationary frame track 121, sprockets 122 and chains 123 suitably arranged and controlled to open the doors when treatment is complete and indexing is appropriate and to close the doors for further treatment. Chains 123 are attached to holders 130 on shuttle frame 126 which is supported by V-shaped rollers 134 in rolling engagement with tracks 121. The shuttle frame is shuttled back and forth by a hydraulic cylinder arrangement or other suitable power means (not shown) causing chains 123 to raise and lower doors 114, 116, 128, 138 and 139. Axles 124 support rotatable sprockets 122. The configuration of the guillotine doors (FIG. 8) 114 and 116 match with the tray spacer units 27 and the open space between them to permit the complete closing of the housing 113 to retain the treatment fluids during their agitation. Spray wash station is a two-stage unit in which each tray is treated after two indexing operations, the water jet manifolds 125 and suitable spray outlets being positioned and supplied to accomplish the spray wash required. Trays first entering the station are sprayed with recirculated wash water to reduce the amounts of water required and prior to their discharge are washed with fresh water.

Inspection station H, which follows wash station G, is a one-tray station, though shortened in the drawings. Station H is equipped with a black light viewing lamp, a white spot lamp and a hand directed air jet spray gun (not shown) for cleansing and drying when necessary the surface areas of the objects not properly cleaned in the spray wash station. Other suitable lights and surface cleansing means may be used.

The trays are next caused to be moved by appropriate indexing through a two-tray drier treatment station I in which the castings are dried using suitable heating means, such as a gas heater. Temperatures of between 200°–250° F. have been found suitable for many fluorescent penetrant treatment fluids. The drier station includes a housing 127 and doors constructed similarly to station G and operated similarly through door reciprocating system 119.

After treatment station I, the trays move into inspection station J preferably equipped with a white spot lamp and an air gun (not shown) where the treated objects in the trays are observed and inspected, and those areas found wet, such as pockets or crevices on the castings, are further dried with an air gun.

Following inspection station J is developer treatment station K and blow-off treatment station L having housing enclosures 129 and 131, respectively, the housings having openings through which the trackway passes, the opening being closed by guillotine doors including a center guillotine door 128 for closing the opening between the housings. Treatment in these housings involves circulating the station K air containing a developer substance which will permit the developer to collect on and adhere to the castings. After being treated with the developer, the trays are advanced into the blow-off station where the developer together with combined treatment substances is blown off the surface of the trays and the contained objects, blowers being suitably arranged and operated to convey the excess dust up exhaust duct 133 into dust collector 135 from which the collected and stored developer is released as needed into the developer housing 129 through feed duct 137. Entrance guillotine door 138, center door 128 and exit door 139 are operated in a similar manner to the previously described doors. There is no elevator platform or lift required for treatment in these stations since the treatment fluids are circulated around the trays positioned at trackway level.

Trays leaving station L move through a dwell station M and then into the unloading station 9 having long rollers 41 arranged for supporting the trays with reduced friction. A control switch 136 on the table 9 is opened when a tray is on the table to prevent indexing which would push the tray off the table. When the tray is removed by the operator by sliding over transport rollers 137 (FIG. 1), the control switch closes permitting appropriate indexing of the trays. Trays are returned to the loading end along tray return ramp 139 having two rows of lower rollers 141 and one row of upper rollers 143 mounted on return frame 144 (FIG. 6).

In FIG. 8, guillotine door 114 has slots 112 for fitting over the spacer units 27 of the trays 15. All housing doors used are similarly constructed to permit the doors to be fully closed around the object-containing sections of the trays.

In the operation of the apparatus, three equipment operators are used, one positioned at the loading platform, one at the transfer station and one at the unloading platform. Additional personnel may be placed at the inspection stations to inspect the objects after treatment or the equipment operators may also perform this function.

A loaded tray 15 is placed on the loading platform 7 and pushed by an operator onto one of the degreasing elevator platforms 45 of the trackway providing the initial treatment most suitable for the type of castings to be treated. The degreasing treatment is performed automatically by a variable pre-set timer, which is activated when the tray is positioned on the elevator and when it is removed, the tray next being pushed into the penetrant station B or BS, which is manually or automatically cycled. As the next tray is pushed into the degreasing station, the first tray is pushed onto the ramp 71 where it is caused by the action of driven roll 70 and the force of gravity to roll down the ramp and rest against the pivotable stop 75.

The operator at the transfer station 19 operates the pivotable stops, the transfer table and the control cabinet 20 (FIG. 1) containing suitable control means for co-ordinating the operation of the indexing station D, the opening and closing of the guillotine doors 114, 116, 128, 138 and 139, the numerous controls of fluid treatment systems, heaters, cooling units and other auxiliary systems.

Trays are pushed from the transfer table 83 to the emulsifier station C and then into the indexing station D where subsequent tray movement is automatically accomplished one tray at a time until the trays reach the unloading platform 9. When the unloading platform 9 is empty and the treatment station doors open, a tray pushed into the indexing station D is indexed or advanced one modular distance, thereby pushing that tray and all trays ahead of it one tray forward. The guillotine doors are then closed and all treatment and inspection operations commence. After the last of these operations is complete, the doors are opened and the trays are again indexed.

Castings are removed at the unloading station for further inspection and the empty trays 15 placed on the tray return ramp 139.

We claim:
1. An apparatus for systematically treating and inspecting a plurality of objects comprising
   (1) a plurality of object-carrying modules capable of being arranged and transported in a tandem abutting relationship each module in turn comprising an object-carrying section and separator means for separating the object-carrying sections of abutting modules;
   (2) a plurality of treatment stations and inspection stations each of which is adapted to accommodate an integral number of modules;
   (3) enclosure means for enclosing at least one treatment station with a module positioned therein, the enclosure means adapted to cooperate with the separator means to permit a complete enclosure around the object-carrying section of the module;
   (4) trackway means extending through the stations for supporting and guiding the modules during their transport, the trackway means in turn comprising a first transport section passing through at least one treatment station and a second transport section passing through subsequent treatment and inspection stations;
   (5) module transport means for transporting the modules along the first transport section; and
   (6) module indexing means for indexing tandemly-arranged abutting modules along the second transport section of the trackway, the modules being moved a sufficient distance along the trackway such that an integral number of modules pass into and out of the stations each time the modules are indexed,
   the operation of the transport means, the indexing means and the treatment station enclosure means being coordinated to provide for the systematic transport of the modules through the treatment and inspection stations.

2. An apparatus of claim 1 in which the trackway means comprises a main trackway and a secondary trackway, each having a reducead-friction surface upon which the modules may be readily transported, the main trackway in turn comprising a first portion which passes through at least one initial treatment station and a second portion forming an extension of the first portion which second portion passes through subsequent treatment and inspection stations and having in addition a module transfer unit for transferring modules between the main and secondary trackways.

3. An apparatus for systematically treating and inspecting a plurality of objects of differing sizes and shapes comprising
   (1) a plurality of tandemly-arranged substantially rectangular modular trays, each tray in turn comprising a frame, a container means supported on the frame for containing objects of differing sizes and shapes and a separator section to separate the tray containers of abutting trays;
   (2) a plurality of treatment stations and inspection stations adapted to accommodate an integral number of trays with at least one of the treatment stations having a movable enclosure to permit fluid treatment of the exposed objects carried by the trays, said movable enclosure being adapted to pass into the tray separator section;
   (3) a main trackway providing a reduced-friction surface upon which the trays may be readily transported, the main trackway including a first portion passing through initial treatment stations and having a second portion forming an extension of the first portion which second portion passes through subsequent treatment and inspections;
   (4) a secondary trackway positioned adjacent to the first portion of the main trackway for transport of the trays as they pass through initial treatment stations;
   (5) tray transfer means for transferring trays from the secondary trackway to the main trackway; and
   (6) transport means for transporting the trays along the trackways.

4. The apparatus of claim 3 in which the transport means includes tray advancing means positioned adjacent the second portion of the main track for intermittently advancing a plurality of tandemly-arranged abutting trays a selected distance along said portion such that an integral number of trays pass into and out of each station each time the trays are advanced.

5. An apparatus for systematically treating and inspecting a plurality of objects of differing sizes and shapes comprising
   (1) a plurality of object-carrying trays capable of being arranged and transported in a tandem abutting relationship, each tray in turn comprising at least one object-carrying section and separator means to provide a space between the object-carrying sections of the trays when they are arranged in a tandem abutting relationship;
   (2) at least one removable container adapted to be supported on the object supporting section of each tray;

(3) a main trackway in turn comprising tray support elements to provide reduced friction as the trays are transported along the trackway, a first portion of the trackway passing through initial treatment stations and a second portion forming an extension of the first portion passing through subsequent treatment stations and passing through at least one inspection station;

(4) a secondary trackway positioned substantially parallel to the first portion of the main trackway, said secondary trackway passing through alternative initial treatment stations;

(5) at least one of said subsequent treatments in turn comprising a fluid-containing housing having entrance and exit openings through which the trackway passes and having movable closure elements for closing the openings, the closure means adapted to engage the tray separator means to form a complete enclosure around the object-carrying section of the tray;

(6) actuatable power means for moving the closure elements to open and close the housing;

(7) transfer means for transferring trays from the secondary trackway to the first portion of the main trackway;

(8) actuatable tray advancing means for intermittently advancing a plurality of tandemly-arranged abutting trays a predetermined distance along the trackway such that an integral number of trays pass into and out of the stations on the trackway each time the trays are advanced; and (9) control means for actuating the power means and the advancing means, whereby the fluid treatment station closure elements are moved to open the station, trays are advanced along the trackway and into the fluid treatment station and other treatment and inspection stations and the closure elements moved to close the station providing treatment and inspection for a selected time before the closures are opened and trays again advanced.

6. The apparatus of claim 5 in which the closure elements are vertically-disposed guillotine doors having a plurality of slots positioned in the lower portion of the doors for passing around the tray when the doors are closed.

7. An apparatus for systematically treating and inspecting a plurality of castings of differing sizes and shapes comprising (1) a plurality of casting trays capable of being arranged and transported in a tandem abutting relationship, each tray in turn comprising a basket containing a casting, a basket support section and a spacer section to provide a space between basket support sections of adjacent trays when they are arranged in a tandem abutting relationship;

(2) a plurality of treatment stations and inspection stations each of which is adapted to accommodate an integral number of modules;

(3) at least one fluid treatment station in turn comprising a fluid-retaining housing having entrance and exit openings therein and doors for closing the openings which doors are adapted to be received by the tray spacer sections to permit the door to fully close to provide for retention of the fluid in the housing during treatment;

(4) power means for opening and closing the doors;

(5) a plurality of trackways positioned through the stations for supporting and guiding the modules, one trackway passing through the openings of fluid treatment station; and (6) module transport means in turn comprising transfer means for transferring modules between trackways and module advancing means positioned adjacent one of said trackways which passes through a number of said stations including said fluid treatment station, said advancing means intermittently advancing a plurality of the tandemly-arranged abutting modules a predetermined distance along the trackway such that an integral number of modules pass into and out of the stations on that trackway each time the modules are advanced.

8. An apparatus for transporting, treating and inspecting a plurality of castings comprising (1) a plurality of equal-sized trays for supporting a plurality of castings in an exposed manner, the trays in turn comprising rectangular frames, a front bumper element, a casting support section and a back bumper element spaced from the casting support section, the trays being capable of arrangement and transportation in a tandem-abutting relationship and the casting support section of each tray being capable of being enclosed while the tray is in abutting arrangement with other trays;

(2) two series of initial treatment stations, each series of stations in turn comprising degreasing means, fluid treatment means and drain means;

(3) a series of subsequent treatment and inspection stations, the series in turn comprising emulsifier means, dip wash means, spray wash means, developer application and removal means, air agitation means and light inspection means;

(4) a main trackway passing through one of the series of initial treatment stations and passing through the series of subsequent treatment and inspection stations having a width sufficient to accommodate the trays when oriented with front and back bumpers perpendicular to the longitudinal axis of the trackway;

(5) a secondary trackway passing through the other series of initial treatment stations positioned parallel to the main trackway;

(6) at least one enclosed treatment station having an entrance and exit through which the main trackway passes and having a power operated closure means for opening and closing the entrance and exit;

(7) tray transport means for transporting the trays on trackways, the transport means in turn comprising rotatable tray support elements suitably positioned along the trackways to provide reduced friction between the trackway and trays, releasable stop means for stopping trays moving under the force of gravity, and tray indexing means for advancing a plurality of tandemly-arranged trays through the series of subsequent treatment and inspection stations;

(8) control means for controlling the tray transport means and power-operated closure means; and (9) tray return means for returning trays from the unloading platforms of the main trackway to the loading platforms of the trackways.

9. The apparatus of claim 8 in which the casting support sections of the trays include casting retaining means positioned around a portion of the periphery of said sections to retain the casting on the trays during their transport.

References Cited

UNITED STATES PATENTS

| 1,360,716 | 11/1920 | Blakeslee | 134—83 |
| 1,490,310 | 4/1924 | Blakeslee | 134—143 XR |
| 1,921,592 | 8/1933 | Talley. | |
| 1,922,888 | 8/1933 | Engelbertz. | |
| 2,726,077 | 12/1955 | Dow | 214—18 XR |
| 3,078,859 | 2/1963 | Davis et al. | 134—83 XR |
| 3,083,716 | 4/1963 | Rowan et al. | 134—49 XR |

DANIEL BLUM, Primary Examiner

U.S. Cl. X.R.

134—49; 214—23; 266—6